(12) United States Patent
Chiang et al.

(10) Patent No.: US 6,471,885 B2
(45) Date of Patent: Oct. 29, 2002

(54) LEATHER COATING COMPOSITION

(75) Inventors: Jin-chih Chiang, Lansdale; Shang-Jaw Chiou, Lower Gwynedd; Frederick James Schindler, Ft. Washington, all of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/843,777

(22) Filed: Apr. 27, 2001

(65) Prior Publication Data

US 2002/0012750 A1 Jan. 31, 2002

Related U.S. Application Data

(60) Provisional application No. 60/208,130, filed on May 31, 2000.

(51) Int. Cl.$^7$ .............................. C14C 9/00; C14C 11/00
(52) U.S. Cl. ...................... 252/8.57; 427/389; 524/558; 524/560; 524/561
(58) Field of Search .................. 252/8.57; 427/389; 524/558, 560, 561

(56) References Cited

U.S. PATENT DOCUMENTS

| | | | |
|---|---|---|---|
| 4,150,005 A | 4/1979 | Gehman et al. | 260/28.5 R |
| 5,149,745 A | 9/1992 | Owens et al. | 525/366 |
| 5,185,387 A | 2/1993 | Klesse et al. | 523/201 |
| 5,723,182 A | 3/1998 | Choi et al. | 427/389 |

*Primary Examiner*—Anthony J. Green
(74) *Attorney, Agent, or Firm*—Ronald D. Bakule

(57) ABSTRACT

An aqueous leather coating composition containing a multi-stage emulsion polymer having a stage of Tg<10° C. which contains a copolymerized carboxylic acid and which has been contacted with a divalent metal oxide, hydroxide, or carbonate and a polymer stage of Tg>20° C. which has been prepared in the presence of 1% to 15% by weight based on the weight of that stage of chain transfer agent is provided. Also, provided is a method for coating leather with the composition of this invention.

10 Claims, No Drawings

LEATHER COATING COMPOSITION

CROSS REFERENCE TO RELATED PATENT APPLICATIONS

This is a non-provisional application of prior pending U.S. provisional application serial No. 60/208,130 filed May 31, 2000.

This invention relates to a leather coating composition. More particularly, this invention relates to an aqueous leather coating composition containing a multi-stage emulsion polymer having a lower Tg (glass transition temperature) polymer stage which contains a copolymerized carboxylic acid and which has been contacted with a divalent metal oxide, hydroxide, or carbonate and a higher Tg polymer stage which has been prepared in the presence of 1% to 15% by weight based on the weight of that stage of chain transfer agent. Also, the invention relates to a method for coating leather with the composition of this invention.

The present invention serves to provide a protective coating that is aesthetically pleasing. The dried coating may be subsequently embossed with a desired imprint in a heated press. The softness of the coated leather and an effective embossed imprint are desirable aesthetic properties of the coated leather.

U.S. Pat. No. 5,723,182 discloses an aqueous leather coating composition containing a multi-stage emulsion polymer which has been contacted with a transition metal oxide, hydroxide, or carbonate. Further improvements in the softness of the coated leather and the ability of the coating to be embossed effectively are desirable The problem faced by the inventors is the provision of an aqueous leather coating composition which yields a dried coated leather that has improved softness and embossability relative to prior compositions, preferably with little or no increase in surface tack of the dried coating. Surprisingly, the inventors found that the use of 1–15% by weight based on the weight of the second stage polymer of a chain transfer agent such as a mercaptan during the formation of the second (harder) stage of a multi-stage emulsion polymer reduced the stiffness and improved the embossability of leather coated with an aqueous composition containing the multi-stage polymer.

According to a first aspect of the present invention there is provided an aqueous leather coating composition including a multi-stage aqueous emulsion polymer including (i) a predominantly acrylic first stage polymer including at least one copolymerized monoethylenically-unsaturated nonionic monomer and from 0.5% to 10% of a copolymerized monoethylenically-unsaturated carboxylic acid monomer, based on the weight of the first stage polymer, the first stage polymer being substantially free from copolymerized multiethylenically-unsaturated monomer; the first stage polymer having a Tg less than 10° C.; the first stage polymer having been contacted with a transition metal oxide, hydroxide, or carbonate at a pH of less than 9 in an amount greater than 0.1 equivalent of transition metal per equivalent of the copolymerized carboxylic acid monomer in the first stage polymer; and (ii) a second stage polymer including at least one copolymerized monoethylenically-unsaturated nonionic monomer and from 0% to 10% of a copolymerized monoethylenically-unsaturated carboxylic acid monomer, based on the weight of the second stage polymer, wherein the second stage polymer is formed in the presence of from 1% to 15% by weight based on the weight of the second stage polymer of chain transfer agent, provided that the second stage copolymerized carboxylic acid monomer is less than 25%, by weight, of the total copolymerized carboxylic acid monomer in the multi-stage emulsion polymer, the second stage polymer being substantially free from copolymerized multiethylenically-unsaturated monomer; the second stage polymer having a Tg greater than 20° C.; and the second stage polymer being from 1% to 50% of the weight of the first stage polymer, based on dry polymer weights, and.

According to a second aspect of the present invention there is provided a method for coating leather including (a) forming an aqueous leather coating composition including a multi-stage aqueous emulsion polymer formed by a method including
  (i) forming a predominantly acrylic first stage polymer including at least one copolymerized monoethylenically-unsaturated nonionic monomer and from 0.5% to 10% of a copolymerized monoethylenically-unsaturated carboxylic acid monomer, based on the weight of the first stage polymer, the first stage polymer being substantially free from copolymerized multiethylenically-unsaturated monomer; and the first stage polymer having a Tg less than 10° C.;
  (ii) contacting the first stage polymer with a transition metal oxide, hydroxide, or carbonate at a pH of less than 9 in an amount greater than 0.1 equivalent of transition metal per equivalent of the copolymerized carboxylic acid monomer in the first stage polymer; and
  (iii) forming a second stage polymer including at least one copolymerized monoethylenically-unsaturated nonionic monomer and from 0 to 10% of a copolymerized monoethylenically-unsaturated carboxylic acid monomer, based on the weight of the second stage polymer, wherein the second stage polymer is formed in the presence of from 1% to 15% by weight based on the weight of the second stage polymer of chain transfer agent, provided that the second stage copolymerized carboxylic acid monomer is less than 25%, by weight, of the total copolymerized carboxylic acid monomer in the multi-stage emulsion polymer, the second stage polymer being substantially free from copolymerized multiethylenically-unsaturated monomer; the second stage polymer having a Tg greater than 20° C.; the second stage polymer being from 1% to 50% of the weight of the first stage polymer, based on dry polymer weights, (b) applying the coating composition to leather; and (c) drying the coating composition.

This invention relates to a leather coating composition and a method for coating leather including a multi-stage polymer prepared by emulsion polymerization. The multi-stage emulsion polymer contains a predominantly acrylic first stage polymer comprising at least one copolymerized monoethylenically-unsaturated nonionic monomer and from 0.5% to 10% of a copolymerized monoethylenically-unsaturated carboxylic acid monomer, based on the weight of the first stage polymer, the first stage polymer being substantially free from copolymerized multiethylenically-unsaturated monomer. By "predominantly acrylic first stage polymer" is meant that greater than 50% of the copolymerized monomers forming the first stage polymer are acrylic, i.e., that they are selected from esters, nitrites, etc. of (meth)acrylic acid. By "nonionic monomer" herein is meant that the copolymerized monomer residue does not bear an ionic charge between pH=2–13. The first stage polymer contains at least one copolymerized monoethylenically-unsaturated nonionic monomer such as, for example, a (meth)acrylic ester monomer including methyl acrylate, ethyl acrylate, butyl acrylate, 2-ethylhexyl acrylate, decyl acrylate, methyl methacrylate, butyl methacrylate, hydroxyethyl methacrylate, hydroxypropyl methacrylate, acetoacetoxyethyl (meth)acrylate, acetoacetoxypropyl (meth) acrylate; styrene or substituted styrenes; butadiene; vinyl acetate or other vinyl esters; vinyl monomers such as vinyl chloride, vinylidene chloride, N-vinyl pyrolidone; and (meth)acrylonitrile. The use of the term "(meth)" followed by another term such as (meth)acrylate or (meth) acrylonitrile, as used throughout the disclosure, refers to both acrylate and methacrylate or acrylonitrile and methacrylonitrile, respectively.

The first stage polymer also contains from 0.5% to 10%, preferably from 1% to 5%, of a copolymerized monoethylenically-unsaturated carboxylic acid monomer, based on the weight of the first stage polymer, such as, for example, acrylic acid, methacrylic acid, crotonic acid, itaconic acid, fumaric acid, maleic acid, monomethyl itaconate, monomethyl fumarate, monobutyl fumarate, and maleic anhydride.

The first stage polymer used in this invention is substantially free from copolymerized multiethylenically-unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene. By "substantially free from copolymerized multiethylenically-unsaturated monomers" herein is meant that levels less than 0.1% based on the weight of the first stage polymer or the second stage polymer such as might be adventitiously introduced as impurities in monoethylenically-unsaturated monomers are not excluded from the polymer composition.

The glass transition temperature ("Tg") of the first stage polymer is less than 10° C., as measured by differential scanning calorimetry (DSC) using the mid-point in the heat flow versus temperature transition as the Tg value. Chain transfer agents such as, for example, mercaptans may be used in an amount effective to provide lower molecular weights.

The first stage polymer is contacted with a transition metal oxide, hydroxide, or carbonate at pH less than pH=9, preferably at pH=3–6, in an amount greater than 0.1 equivalent of transition metal per equivalent of copolymerized carboxylic acid monomer in the first stage polymer according to the process disclosed in U.S. Pat. No. 5,221,284. The oxides, hydroxides, and carbonates of zinc, aluminum, tin, tungsten, and zirconium are preferred for low cost, low toxicity, and low color in the dried coating. Zinc oxide is more preferred. The transition metal oxide, hydroxide, or carbonate may be added slurried in water, optionally with an added dispersant such as, for example a low molecular weight homopolymer or copolymer of (meth)acrylic acid. The transition metal oxide, hydroxide, or carbonate may be added during the polymerization process or after the polymerization of one or more stages has been completed.

The multi-stage polymer also contains a second stage polymer comprising at least one copolymerized monoethylenically-unsaturated nonionic monomer and from 0% to 10% of a copolymerized monoethylenically-unsaturated carboxylic acid monomer, based on the weight of the second stage polymer, provided that the second stage copolymerized carboxylic acid monomer is less than 25%, by weight, of the total copolymerized carboxylic acid monomer in the multi-stage copolymer; the second stage polymer being substantially free from copolymerized multiethylenically-unsaturated monomer; the second stage polymer having a Tg of greater than 20° C., and the second stage polymer being from 1% to 50%, preferably from 5% to 20%, of the weight of the first stage polymer, based on dry polymer weights. The copolymerized monoethylenically-unsaturated nonionic monomer, copolymerized monoethylenically-unsaturated carboxylic acid monomer, and copolymerized multiethylenically-unsaturated monomer of the second stage polymer are defined and exemplified as for the first stage polymer herein.

The second stage polymer must be formed in the presence of 1% to 15%, preferably from 2% to 5%, by weight based on the dry weight of the second stage polymer of a chain transfer agent, such as, for example, halogen compounds such as tetrabromomethane; allyl compounds; or mercaptans such as alkyl thioglycolates, alkyl mercaptoalkanoates, and $C_4$–$C_{22}$ linear or branched alkyl mercaptans. Chain transfer agent(s) may be added in one or more additions or continuously, linearly or not, over most or all of the entire reaction period or during limited portion(s) of the reaction period. The chain transfer agent is preferably a mercaptan, more preferably a mercaptan selected from methyl 3-mercaptopropionate, butyl 3-mercaptopropionate, n-dodecyl mercaptan, and mixtures thereof.

The polymerization techniques used to prepare such aqueous multi-stage emulsion-polymers are well known in the art such as, for example, U.S. Pat. Nos. 4,325,856; 4,654,397; 4,814,373; and 5,723,182. In the multi-stage polymerization process at least two stages differing in composition are formed in sequential fashion. In the emulsion polymerization process conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used. The reaction temperature is maintained at a temperature lower than 100° C. throughout the course of the reaction. Preferred is a reaction temperature between 30° C. and 95° C., more preferably between 50° C. and 90° C. The monomer mixture may be added neat or as an emulsion in water. The monomer mixture may be added in one or more additions or continuously, linearly or not, over the reaction period, or combinations thereof Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the above initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used.

Such a multi-stage process usually results in the formation of at least two mutually incompatible polymer compositions, thereby resulting in the formation of at least two polymeric phases. The mutual incompatibility of two polymer compositions and the resultant multiphase structure of the polymer particles may be determined in various ways known in the art. The use of scanning electron microscopy using staining techniques to emphasize the difference between the appearance of the phases, for example, is such a technique.

The average particle diameter of the emulsion-polymerized polymer particles is preferred to be from 30 nanometers to 500 nanometers.

The aqueous leather coating composition is prepared by techniques which are well known in the coatings art. First, at least one pigment is well dispersed in an aqueous medium under high shear such as is afforded by a COWLES (R) mixer or, in the alternative, at least one predispersed colorant is used. Then the multi-stage emulsion-polymer is added under low shear stirring along with other coatings adjuvants as desired. The aqueous coating composition may contain, in addition to the pigment(s) and the multi-stage emulsion polymer, conventional coatings adjuvants such as, for example, emulsifiers, coalescing agents, curing agents, buffers, dullers, neutralizers, thickeners, rheology modifiers, humectants, wetting agents, biocides, plasticizers, antifoaming agents, colorants, waxes, and anti-oxidants.

The solids content of the aqueous coating composition may be from about 10% to about 50% by volume. The viscosity of the aqueous polymeric composition may be from about 50 centipoise to about 10,000 centipoise, as measured using a Brookfield viscometer; the viscosities appropriate for different application methods vary considerably.

The aqueous coating composition may be applied to leather such as, for example, mineral tanned or vegetable tanned leather including full-grain leather, buffed or corrected-grain leather, and split leather with or without a prior treatment with an impregnating resin mixture using conventional coatings application methods such as, for example, curtain coater and spraying methods such as, for example, air-atomized spray, air-assisted spray, airless spray, high volume low pressure spray, and air-assisted airless spray.

Abbreviations

MMA=methyl methacrylate

BA=butyl acrylate

EA=ethyl acrylate

AA=acrylic acid

50% relative humidity. The samples were clamped at a grip distance of 2.54 cm (1 inch) and pulled at a crosshead speed of 25.4 cm(10 inches)/ minute. Stiffness was measured as the psi at 100% elongation (M100 ). Stiffness is considered significant only on a relative basis within a single series to eliminate variations in temperature, humidity, etc. from day to day.

The following examples are presented to illustrate the invention and the results obtained by the experimental methods, unless otherwise noted.

EXAMPLE 1

Preparation of Multi-stage Aqueous Emulsion Polymer

Preparation of Polymer 10. To a 5000 ml round bottom flask, fitted with a stirrer, condenser, temperature monitor and nitrogen flush, was added 1271 g DI water. A monomer premix was prepared from 230 g DI water, 18.6 g sodium lauryl sulfate (28%), 67.4 g sodium dodecyl benzene sulfonate (23%), 491.4 g EA, 360 g BA, 17.1 g AAEM, and 31.5 g AA. The entire monomer premix was transferred to the flask, with 22 ml DI water, followed at one minute intervals by 3.6 ml 0.15% aqueous solution of ferrous sulfate heptahydrate, 0.21 g ammonium persulfate dissolved in 19 g DI water, and 1.09 g sodium hydrosulfite dissolved in 40 g DI water and 0.19 g ammonium hydroxide. Within ten minutes the temperature increased to 85° C. When the temperature dropped to 60° C., 97 g MMA and 3 g MMP were added. Two minutes later 0.42 g t-butylhydroperoxide in 19 g DI water and 0.29 g isoascorbic acid in 22 g DI water were added. The temperature increased 2–3° C. over about five minutes. When the temperature dropped below 50° C., 2.16 g t-butyl hydroperoxide in 33 g DI water and 1.08 g sodium metabisulfite dissolved in 33 g DI water were added over 90 minutes. With the temperature below 50° C., 3.9 g ZnO was added to the polymer. After an hour, 25 g ammonium hydroxide in 11 g DI water was added. After 10 minutes, the polymer dispersion was filtered. The resulting polymer dispersion was found to have 34.5% solids content, pH=9.3, and a Brookfield viscosity (LV spindle 2 @60 rpm) of 10 cps.

EXAMPLE 2

Preparation of Various Multi-stage Aqueous Emulsion Polymers

Preparation of Polymers 1–9 and 11–22 and Comparative Polymers A–F. Polymers 1–22 and Comparative Polymers A–F were prepared according to the process of Example 1 with the exception of the ingredients and amounts as presented in Table 2.1. All values in Table 2.1 are in parts by weight with the exception of "ZnO equiv." which values are equivalents of Zn per equivalents of copolymerized acrylic acid in the first stage (Stage 1) polymer.

AAEM=acetoacetoxyethyl methacrylate

Sty=styrene

BMP=butyl 3-mercaptopropionate n-DDM=n-dodecyl mercaptan

MMP=methyl 3-mercaptopropionate

DI water=deionized water

Experimental Methods

Embossability

Embossability was characterized by evaluation of hair cell print quality. The leather coating compositions were sprayed on ½ square foot of upholstery grade corrected grain leather to give a wet add-on of 15 grams/square foot. The coated leather was dried for 2 minutes in an oven at 90° C., then ironed with a hot roll and placed on rods overnight. The following day the coat was embossed with a coarse haircell print in a press applying 50 tons for 5 seconds with the plate at 95° C. The pieces were examined with a low power microscope and 8×magnifying glass to compare for quality of print. The quality of print was judged by (a) the smoothness of the surface between hair-cell depressions and (b) the sharpness and depth of the hair-cell depressions. With poor molding, the surface between the hair-cell depressions shows tiny pits remaining from microfoam generated during spraying, and the hair-cell depressions are shallow, with sloping sides. With excellent molding the polymer has flowed to eliminate any pits from the microfoam, and the hair-cell depressions are deep, with sides nearly perpendicular to the bottom of the depressions.

Stiffness

The stiffness of coated leather was measured by tensile testing as an inverse indicator of softness of the coated leather. Films were prepared for tensile test by diluting the polymers to 20% solids, then drying 20 grams in a petrie dish bottom at 48.9° C. (120° F.), giving a dry film about) 0.51 mm (20 mils) in thickness. Pieces of film were cut with a dogbone die giving 0.634 cm (0.25 inch) width and 1.905 cm (0.75 inch) gauge length, then equilibrated in a room at about 23.9° C. (75° F.) and

EXAMPLE 3

Evaluation of Coated Leather

Leather coating compositions were prepared by admixing the following ratios of components:

| | | |
|---|---|---|
| EUDERM White D-C | 200 | (white pigment dispersion, 60% solids) |
| Water | 50 | |
| EUDERM Nappa Soft S | 100 | (Filler & flow control agent, mixture of fatty acid esters, 25% solids) |
| EUDERM Duller SN | 50 | (Aqueous duller dispersion, silicon dioxide in acrylic dispersion, 25% solids) |
| Polymer (35% solids) | 500 | (Polymer 1 or 2 or Comp. A) |

The formulations were adjusted to about 21 seconds viscosity (Zahn #2) using a 1/1 mixture of EUKANOL Paste M/water (EUKANOL Paste M is a thickener formulation based on alkali-soluble acrylic).(EUDERM and EUKANOL are trademarks of Bayer AG)

Polymers compared in this example were prepared with a 90/10 ratio of first to second stage, a first stage composition of 20 BA/75.3 EA/2.8 AA/1.9 AAEM, with variation of second stage composition. The second stage compositions and results are shown in Table 3.1.

Leather bearing dried coating compositions of the invention containing polymers 1 and 2 exhibit superior softness and hair cell print quality compared to leather bearing the dried coating composition of polymer Comparative A, the second stage polymer of which is not prepared in the presence of 1% to 15% by weight based on the weight of the second stage polymer of chain transfer agent.

EXAMPLE 4

Evaluation of Coated Leather

Leather coating compositions were prepared by admixing the following ratios of components:
Formulations were thickened to 21 sec #2 Zahn with EUKANOL Paste M, then applied by spray to 1 square foot pieces of corrected grain upholstery leather at a wet add-on of 15 g/square foot. The coated leather was dried for 2 minutes in an oven at 90° C., then cut into two pieces. One set of pieces was sprayed with 1 g/square foot of 2/1 HYDRHOLAC R/water as a "intermediate plate coat". (HYDRHOLAC R is an emulsion of cellulose nitrate polymer and solvent).(HYDRHOLAC is a trademark of Rohm and Haas Company). Embossing was carried out at 93° C.

Polymers compared in the experiment were prepared with a 90/10 ratio of first to second stage, a first stage composition of 30 BA/65.3 EA/2.8 AA/1.9 AAEM, with variation of second stage composition. An additional composition with first stage composition 40 BA/55.3 EA/2.8 AA/1.9 AAEM was included. The compositional factors varied and results are shown in Table 4.1.

Leather bearing dried coating compositions of the invention containing polymers 3–5 exhibit superior softness and hair cell print quality compared to leather bearing the dried coating composition of polymer Comparative B, the second stage polymer of which is not prepared in the presence of 1% to 15% by weight based on the weight of the second stage polymer of chain transfer agent.

EXAMPLE 5

Evaluation of Coated Leather

Leather coating compositions were prepared by admixing the following ratios of components:
Compositions were thickened to 20 sec #2 Zahn with EUKANOL Paste M, then applied by spray to 1 square foot pieces of corrected grain upholstery leather at a wet add-on of 15 grams/square foot. The coated leather was dried for 2 minutes in an oven at 90° C., then ironed with a hot roll and cut into two pieces. One set of pieces was sprayed with 1 g/square foot of 1/1 ISODERM LA-01/water as a "intermediate plate coat". (ISODERM LA-01 is an emulsion of cellulose nitrate polymer and solvent). (ISODERM is a trademark of Bayer AG).

On the following day both sets were embossed with a coarse hair cell plate in a press using 50 tons for 5 seconds with a plate temperature of 83° C. for the set without intermediate plate coat and of 96° C. for the set with intermediate plate coat. Both sets were compared for quality of print and an overall comparative assessment of relative quality was made.

Polymers compared in the experiment were prepared with a 90/10 ratio of first to second stage, a first stage composition of 96.5 BA/3.5 AA with variation of second stage composition. An additional composition with first stage composition 94.5 BA/3.5 AA/2 AAEM was included. The compositional factors varied and results are shown in Table 5.1.

Leather bearing dried coating compositions of the invention containing polymers 6–8 exhibit superior softness and hair cell print quality compared to leather bearing the dried coating composition of polymer Comparative c, the second stage polymer of which is not prepared in the presence of 1% to 15% by weight based on the weight of the second stage polymer of chain transfer agent.

EXAMPLE 6

Evaluation of Coated Leather

Leather coating compositions were prepared by admixing the following ratios of components:
Compositions were applied by spray to 1 square foot pieces of corrected grain upholstery leather at a wet add-on of 15 g/square foot. The coated leather was dried for 2 minutes in an oven at 90 C. A second coat was then sprayed with a wet add-on of 8 g/sqft and dried for 2 minutes in an oven at 90° C. The leathers were then rated for tack by pressing the coated surface against itself The leathers were then cut in two. One set of pieces was sprayed with 1 g/sqft of 1/1 EUSIN Lustre EG/water as a "intermediate plate coat". (EUSIN Lustre EG is an emulsion of cellulose acetate butyrate polymer and solvent). (EUSIN is a trademark of Bayer AG)

On the following day the set with intermediate topcoat was embossed with a coarse hair cell plate in a press using 50 tons for 5 seconds with a plate temperature of 95° C. A third coat was sprayed on both sets at a wet add-on of 6 g/sqft. Both sets were topcoated with 4 g/sqft of 2/1 ORTHOCLEAR OC-66butyl acetate (ORTHOCLEAR OC-66 is a formulation of nitrocellulose in solvent) and the set without intermediate topcoat was embossed after topcoating, using the same embossing conditions. Both sets were compared for quality of print and an overall comparative assessment of relative quality was made.

Polymers compared in the experiment were prepared with a first stage composition of 40 BA/54.6 EA/3.5 AA/1.9 AAEM with variation of stage ratio and second stage composition. The compositional factors varied and results are shown in Table 6.1.

Leather bearing a dried coating composition of the invention containing polymer 11 exhibits superior softness and hair cell print quality compared to leather bearing the dried coating composition of polymer Comparative E, the second stage polymer of which is not prepared in the presence of 1% to 15% by weight based on the weight of the second stage polymer of chain transfer agent. Even at the lower 5% hard stage level, leather bearing a dried coating composition of the invention containing polymer 9 exhibits superior softness and hair cell print quality compared to leather bearing the dried coating composition of polymer Comparative D, the second stage polymer of which is not prepared in the presence of 1% to 15% by weight based on the weight of the second stage polymer of chain transfer agent.

EXAMPLE 7

Evaluation of Coated Leather

Leather coating compositions were prepared by admixing the following ratios of components:
Formulations were applied by spray to ½ square feet pieces of corrected grain upholstery leather at a wet add-on of 15 g/square foot. The coated leather was dried for 2 minutes in an oven at 90° C. A second coat was then sprayed with a wet add-on of 7 g/square foot and dried for 2 minutes in an oven at 90° C. The leathers were then rated for tack by pressing the coated surface against itself. The leathers were then sprayed to give a wet add-on of 1 g/sqft of 1/1 EUSIN Lustre EG/water as a "intermediate plate coat".

Polymers compared in the experiment were prepared with a 90/10 stage ratio and first stage composition of 40 BA/54.6 EA/3.5 AA/1.9 AAEM, with variation of second stage chain transfer agent and amount.

All three mercaptan chain transfer agents led to reduced stiffness of leather coated with dried coating compositions of the invention, but BMP was less efficient than MMP and n-DDM was much less efficient.

EXAMPLE 8

Evaluation of Coated Leather

Leather coating compositions were prepared by admixing the following ratios of components:
Formulations were applied by spray to ½ square feet pieces of corrected grain upholstery leather at a wet add-on of 15 g/square foot. The coated leather was dried for 2 minutes in an oven at 90 C. A second coat was then sprayed with a wet add-on of 7 g/square foot and dried for 2 minutes in an oven at 90° C. The leathers were then rated for tack by pressing the coated surface against itself. One half of each piece was then sprayed to give a wet add-on of 1 g/square foot of 1/1 EUSIN Lustre EG/water as a "intermediate plate coat".

Polymers compared in the experiment were prepared with a 90/10 stage ratio and first stage composition of 60 BA/34.6 EA/3.5 AA/1.9 AAEM, with variation of second stage composition. The compositional factors varied and results are shown in Table 8.1

Leather bearing dried coating compositions of the invention containing polymers 15–16 exhibit superior softness and hair cell print quality compared to leather bearing the dried coating composition of polymer Comparative F, the second stage polymer of which is not prepared in the presence of 1% to 15% by weight based on the weight of the second stage polymer of chain transfer agent.

EXAMPLE 9

Evaluation of Coated Leather

Leather coating compositions were prepared by admixing the following ratios of components:
Formulations were applied by spray to 1 square foot pieces of corrected grain upholstery leather at a wet add-on of 15 g/square foot. The coated leather was dried for 2 minutes in an oven at 90° C. The coated leathers were cut into two pieces. With one set, half of each piece was sprayed with 1/1 ISODERM LA-01/water at wet add-on of 1 g/sqft. This set was then embossed with a coarse haircell plate in a press at 50 tons for 5 seconds at a plate temperature of 90° C. Both sets were then again sprayed with a coat to give a wet add-on of 10 g/sqft. The set not previously embossed was sprayed on ½ of each piece with ISODERM LA-01/water and embossed as above. An overall assessment of print from the sets was made. Tack comparisons for this experiment were made with the clear films rather than the coated leathers.

Polymers compared in the experiment were prepared with a constant second stage composition of 95 MMA/5 BMP. The compositional factors varied and results are shown in Table 9.1. The zinc level is expressed as a ratio of equivalents of zinc to equivalents of AA in the first stage.

Leather bearing dried coating compositions of the invention containing polymers 17–22 have a better combination of softness, tack and print than leather bearing dried coating compositions containing comparative polymers prepared without chain transfer agent in the second stage. Decrease in zinc gives further decrease in stiffness but at the expense of some increase in tack and decrease in quality of print. Increasing the ratio of BA/EA has little effect on tack or stiffness but decreases quality of print. Increasing the level of MMA/BMP second stage decreases tack and improves molding at high BA/EA, but also increases stiffness.

What is claimed is:

1. An aqueous leather coating composition comprising a multi-stage aqueous emulsion-polymer comprising (i) a predominantly acrylic first stage polymer comprising at least one copolymerized monoethylenically-unsaturated nonionic monomer and from 0.5% to 10% of a copolymerized monoethylenically-unsaturated carboxylic acid monomer, based on the weight of said first stage polymer, said first stage polymer being substantially free from copolymerized multiethylenically-unsaturated monomer, said first stage polymer having Tg less than 10° C., said first stage polymer having been contacted with a transition metal oxide, hydroxide, or carbonate at a pH of less than 9 in an amount greater than 0.1 equivalent of transition metal per equivalent of said copolymerized carboxylic acid monomer in said first stage polymer; and (ii) a second stage polymer comprising at least one copolymerized monoethylenically-unsaturated nonionic monomer and from 0% to 10% of a copolymerized monoethylenically-unsaturated carboxylic acid monomer, based on the weight of said second stage polymer wherein said second stage polymer is formed in the presence of from 1% to 15% by weight based on the weight of said second stage polymer of chain transfer agent, provided that said second stage copolymerized carboxylic acid monomer is less than 25%, by weight, of the total copolymerized carboxylic acid monomer in said multi-stage emulsion polymer, said second stage polymer being substantially free from copolymerized multiethylenically-unsaturated monomer, said second stage polymer having Tg greater than 20° C.; and said second stage polymer being from 1% to 50% of the weight of said first stage polymer, based on dry polymer weights.

2. The composition of claim 1 wherein said copolymerized monoethylenically-unsaturated carboxylic monomer in said first stage polymer is selected from the group consisting of acrylic acid and itaconic acid.

3. The composition of claim 1 wherein said transition metal oxide, hydroxide, or carbonate is zinc oxide.

4. The composition of claim 1 wherein said second stage polymer is formed in the presence of from 2% to 5% by weight based on the weight of said second stage polymer of a mercaptan chain transfer agent.

5. The composition of claim 1 wherein said second stage polymer is from 5% to 20% of the weight of said first stage polymer.

6. A method for coating leather comprising
   (a) forming an aqueous leather coating composition comprising a multi-stage aqueous emulsion-polymer formed by a method comprising
      (i) forming a predominantly acrylic first stage polymer comprising at least one copolymerized monoethylenically-unsaturated nonionic monomer and from 0.5% to 10% of a copolymerized monoethylenically-unsaturated carboxylic acid monomer, based on the weight of said first stage polymer, said first stage polymer being substantially free from copolymerized multiethylenically-unsaturated monomer; and said first stage polymer having a Tg less than 10° C.;
      (ii) contacting said first stage polymer with a transition metal oxide, hydroxide, or carbonate at a pH of less than 9 in an amount greater than 0.1 equivalent of transition metal per equivalent of said copolymerized carboxylic acid monomer in said first stage polymer; and
      (iii) forming a second stage polymer comprising at least one copolymerized monoethylenically-unsaturated nonionic monomer and from 0 to 10% of a copolymerized monoethylenically-unsaturated carboxylic acid monomer, based on the weight of said second stage polymer, wherein said second stage polymer is formed in the presence of from 1% to 15% by weight based on the weight of said second stage polymer of chain transfer agent, provided that said second stage copolymerized carboxylic acid monomer is less than 25%, by weight, of the total copolymerized carboxylic acid monomer in said multi-stage emulsion polymer, said second stage polymer being substantially free from copolymerized multiethylenically-unsaturated monomer, said second stage polymer having a Tg greater than 20° C., and said second stage polymer being from 1% to 50% of the weight of said first stage polymer, based on dry polymer weights,
   (b) applying said coating composition to leather; and
   (c) drying said coating composition.

7. The method of claim 6 wherein said copolymerized monoethylenically-unsaturated carboxylic monomer in said first stage polymer is selected from the group consisting of acrylic acid and itaconic acid.

8. The method of claim 6 wherein said transition metal oxide, hydroxide, or carbonate is zinc oxide.

9. The method of claim 6 wherein said second stage polymer is formed in the presence of from 2% to 5% by weight based on the weight of said second stage polymer of a mercaptan chain transfer agent.

10. The method of claim 6 wherein said second stage polymer is from 5% to 20% of the weight of said first stage polymer.

* * * * *